United States Patent
Lo (10) Patent No.: US 7,624,197 B1
(45) Date of Patent: Nov. 24, 2009

(54) APPARATUS AND METHOD FOR AUTOMATIC SPEED DOWNSHIFT FOR A TWO PAIR CABLE

(75) Inventor: William Lo, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 1796 days.

(21) Appl. No.: 09/991,043

(22) Filed: Nov. 21, 2001

Related U.S. Application Data (60) Provisional application No. 60/256,535, filed on Dec. 18, 2000.

(51) Int. Cl.
G06F 15/16 (2006.01)

(52) U.S. Cl. .................... 709/250; 709/233

(58) Field of Classification Search ............ 709/233, 709/250; 375/275; 370/465
See application file for complete search history.

(56) References Cited

U.S. PATENT DOCUMENTS

| | | | |
|---|---|---|---|
| 5,410,535 A | 4/1995 | Yang et al. | |
| 5,414,708 A | 5/1995 | Webber et al. | |
| 5,577,023 A | 11/1996 | Marum et al. | |
| 5,809,026 A | 9/1998 | Wong et al. | |
| 5,841,985 A | 11/1998 | Jie et al. | |
| 5,892,926 A | 4/1999 | Witkowski et al. | |
| 5,923,663 A | 7/1999 | Bontemps et al. | |
| 5,936,963 A * | 8/1999 | Saussy | 370/447 |
| 5,991,885 A * | 11/1999 | Chang et al. | 713/300 |
| 6,072,803 A * | 6/2000 | Allmond et al. | 370/445 |
| 6,085,241 A | 7/2000 | Otis | |
| 6,148,025 A | 11/2000 | Shirani et al. | |
| 6,169,475 B1 | 1/2001 | Browning | |
| 6,175,865 B1 | 1/2001 | Dove et al. | |
| 6,243,756 B1 | 6/2001 | Whitmire et al. | |
| 6,272,552 B1 | 8/2001 | Melvin et al. | |
| 6,332,166 B1 * | 12/2001 | Cranford et al. | 709/250 |
| 6,377,640 B2 * | 4/2002 | Trans | 375/354 |
| 6,529,957 B1 * | 3/2003 | Joergensen | 709/233 |
| 6,556,589 B2 * | 4/2003 | McRobert et al. | 370/501 |
| 6,898,185 B1 * | 5/2005 | Agazzi et al. | 370/241 |
| 6,928,106 B1 * | 8/2005 | Agazzi | 375/219 |
| 7,161,911 B1 * | 1/2007 | Fang et al. | 370/282 |
| 7,173,431 B1 * | 2/2007 | Lo et al. | 324/543 |
| 7,190,172 B1 * | 3/2007 | Lo et al. | 324/543 |
| 2008/0155326 A1 * | 6/2008 | Agazzi et al. | 714/26 |

FOREIGN PATENT DOCUMENTS

| | | |
|---|---|---|
| EP | 00273080 A1 | 7/1988 |
| EP | 00577435 A1 | 7/1993 |
| EP | 00596523 A2 | 5/1994 |
| EP | 00596523 A3 | 1/1996 |
| EP | 00577435 B1 | 2/1999 |
| WO | WO 9413072 A1 | 6/1994 |
| WO | WO 9619877 A1 | 6/1996 |
| WO | WO 0054419 A1 | 9/2000 |

* cited by examiner

Primary Examiner—Douglas B Blair (57) ABSTRACT

A physical layer of a first network device is connected to cable of an Ethernet network. A digital signal processor (DSP) is connected to the cable. The DSP receives and decodes first signals on the cable from a second device. The DSP codes and transmits second signals to the second device on the cable. An autonegotiation controller is connected to the DSP and includes a cable detector that determines a first number of pairs of twisted pair wires of the cable that are operable. The autonegotiation controller also includes a speed adjuster that masks an advertised speed of the first device when the cable detector determines that the first number is less than the number required for a requested speed of the first device.

158 Claims, 3 Drawing Sheets

APPARATUS AND METHOD FOR AUTOMATIC SPEED DOWNSHIFT FOR A TWO PAIR CABLE

CROSS-REFERENCE TO RELATED APPLICATIONS

This application claims the benefit of U.S. Provisional Application No. 60/256,535, filed Dec. 18, 2000, which is hereby incorporated by reference.

FIELD OF THE INVENTION

The present invention relates to networks, and more particularly to autonegotiation controllers within the physical layer of devices that are connected to an Ethernet network.

BACKGROUND OF THE INVENTION

Figure 1:
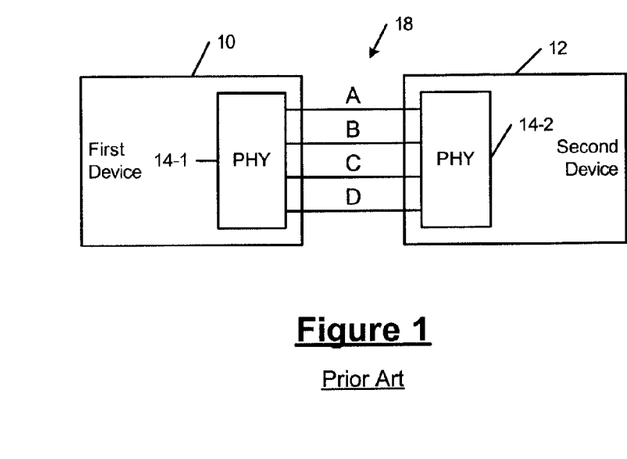
FIG. 1 illustrates two devices that are connected together by a cable plant with four pairs of twisted pair wires according to the prior art.

Referring now to FIG. 1, first and second devices 10 and 12 include physical layers 14-1 and 14-2 that are connected by cable 18 that includes four pairs of twisted pair wires (A, B, C and D). The physical layers 14 usually include digital signal processors (DSPs) and autonegotiation controllers (both not shown). The DSP of the first device receives and decodes signals from the second device. The DSP of the first device codes and transmits signals to the second device. The four pairs of twisted pair wires are typically labeled A (1,2), B (3, 6), C (4,5), and D (7,8). In 10BASE-T and 100BASE-TX mode, only pairs A (1,2) and B (3,6) are required to autonegotiate and to establish a link. In 1000BASE-T mode, however, two pairs of twisted pair wires are required to autonegotiate and four pairs are required to establish a link.

In 10BASE-T, 100BASE-TX, and 1000BASE-T modes, the physical layer performs autonegotiation before a link is established. During autonegotiation, the devices 10 and 12 negotiate the operating speed of the link as well as other functional capabilities of the devices. A device can advertise operating speeds that are less than or equal to the maximum operating speed of the device.

Figure 2:
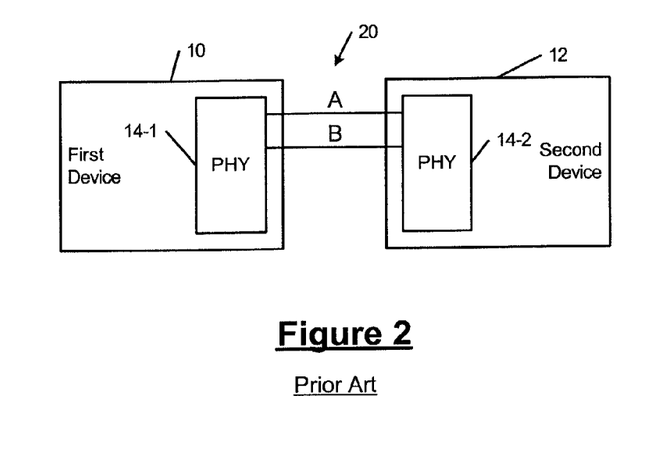
FIG. 2 illustrates two devices that are connected together by a cable plant with two pairs of twisted pair wires according to the prior art.

Compliant cable for Ethernet over twisted pair cables requires four pairs of twisted pair wires to be available even if they are not used. Referring now to FIG. 2, in some situations (for example due to cost or malfunctions), cable 20 provides only two operable pairs of twisted pair wires and is therefore non-compliant. The 1000BASE-T mode cannot establish a link over the non-compliant cable 20. However, 1000BASE-T autonegotiation on the non-complaint cable can be completed successfully. When the two devices attempt to establish the 1000BASE-T link, the link fails because only two pairs of twisted pair wires are available. The devices cycle through successful autonegotiation and unsuccessful link modes and are never able to exchange data.

To establish the 1000BASE-T link over compliant cable, the following steps are usually performed. In a first step, autonegotiation determines that both devices have 1000BASE-T capability. One device is designated the master device and the other device is designated the slave device. In a second step, after autonegotiation completes, the master device begins transmitting on all four pairs. Embedded in the transmit signal is an indication that the master device has not locked onto the transmit signal of the slave device. The slave device recovers the data on all four pairs of twisted pair wires. During the recovery time, the slave device does not transmit any data.

In a third step, after the slave locks onto the transmit signal of the master device and before starting echo cancellation, the slave device begins transmitting on all four pairs of twisted pair wires. Embedded in the transmit signal of the slave device is an indication that the slave device has not locked onto the transmit signal of the master device. In other words, the slave device has not completed echo cancellation. In a fourth step, both the master and slave devices transmit on all four pairs of twisted pair wires. The master and the slave devices perform echo cancellation and recover the data from each other. Once echo cancellation is complete and both devices lock onto the transmit signals, both devices transmit an indication that they are locked and ready to transmit and receive data. Then, the link is brought up. The DSP of each device must be locked onto the signals and the coding on all four pairs of twisted pair wires must be correct before the indication is sent.

If the second to fourth steps do not complete within a predetermined amount of time, the master and/or slave device times out and stops transmitting. Control returns to the first step. The time limit is usually governed by a maxwait timer in the autonegotiation controller.

To recover the incoming signals, the DSPs in the master and slave devices perform the following steps: When a transmit signal is detected on the twisted pair wire, the DSP starts tracking the incoming transmit signal. The DSP equalizes the transmit signal and locates an ideal sampling point to capture the transmit signal. The sampling process requires some time to complete before the DSP locks onto the transmit signal. During the sampling and locking process, the error rate decreases as the DSP converges to the ideal sampling point and locks onto the transmit signal.

Once the signal is locked, a physical coding sublayer (PCS) circuit of the DSP determines whether the incoming signal was encoded correctly to determine the validity of the incoming signal. It is possible for the DSP to lock onto a signal that was incorrectly encoded. An example in 1000BASE-T encoding is a signal that is all 0's. Since 0 is a valid signal level, the DSP will lock onto the 0. Since there are no transitions in the signal, any sampling point is the ideal sampling point. Since 1000BASE-T coding does not allow a signal to remain at 0 indefinitely, the coding of the received signal must be checked to determine the validity of the recovered signal.

SUMMARY OF THE INVENTION

A physical layer according to the invention of a first network device is connected to cable of an Ethernet network. A digital signal processor (DSP) is coupled to the cable. The DSP receives and decodes first signals on the cable from a second device. The DSP codes and transmits second signals to the second device on the cable. An autonegotiation controller communicates with the DSP and includes a cable detector that determines a first number of pairs of twisted pair wires of the cable that are operable.

In other features of the invention, the autonegotiation controller includes a speed adjuster that masks an advertised speed of the first device when the cable detector determines that the first number is equal to two and that a first speed is requested by the first device. The speed adjuster does not mask the advertised speed of the first device when the first number is four. The speed adjuster also does not mask the advertised speed when the requested speed is less than the first speed.

In still other features, the speed adjuster increments a first counter when the cable detector determines that the first number is equal to two and autonegotiation fails. The speed adjuster resets and sets the first counter equal to zero when the first counter is equal to a first limit.

In still other features, the cable detector includes a maxwait timer and has a first state. The cable detector transitions from the first state to a second state when the DSP receives signals on at least one of a first pair and a second pair of twisted pair wires. The cable detector transitions from the second state to a third state when the DSP receives and decodes signals on the first and second pairs of twisted pair wires. The cable detector transitions from the second state to a fourth state when the DSP receives signals on at least one of the first and second pairs but not the third and fourth pairs and the maxwait timer times out.

In yet other features of the invention, the cable detector transitions from the third state to the fourth state when the DSP receives and decodes signals on the first and second pairs but does not receive signals on the third and fourth pairs and the maxwait timer times out. The cable detector includes a slave counter that is incremented each time the cable detector transitions to the fourth state. The cable detector returns to the first state when the slave counter is less than slimit and the cable detector sets the first number equal to two when the slave counter equals slimit.

In still other features, the cable detector transitions from the first state to a fifth state when the maxwait timer times out and the DSP fails to detect signals on the first pair and the second pair. The cable detector includes a master counter that is incremented each time that the cable detector transitions to the fifth state.

In still other features, the cable detector returns to the first state when the master counter is less than mlimit and the cable detector sets the first number equal to two when the master counter equals mlimit. The cable detector sets the first number equal to four when the DSP receives and decodes signals on the first, second, third and fourth pairs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An autonegotiation controller according to the present invention advantageously breaks the cycling between successful autonegotiation and unsuccessful link establishment modes. The autonegotiation controller adjusts advertised speeds to a lower speed if both devices are capable of running run at the lower speed. For example, the devices can be run in 10BASE-T and 100BASE-TX modes, which require only two pairs of twisted pair wires. Operation at the reduced speed is a better alternative than a completely disabled link.

Figure 3:
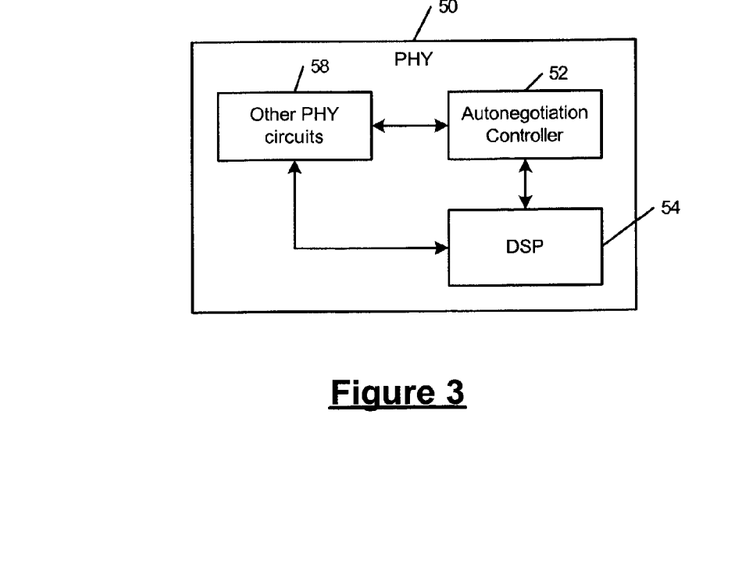
FIG. 3 is a functional block diagram of a device with a physical layer that includes an autonegotiation controller according to the present invention.
Figure 4:
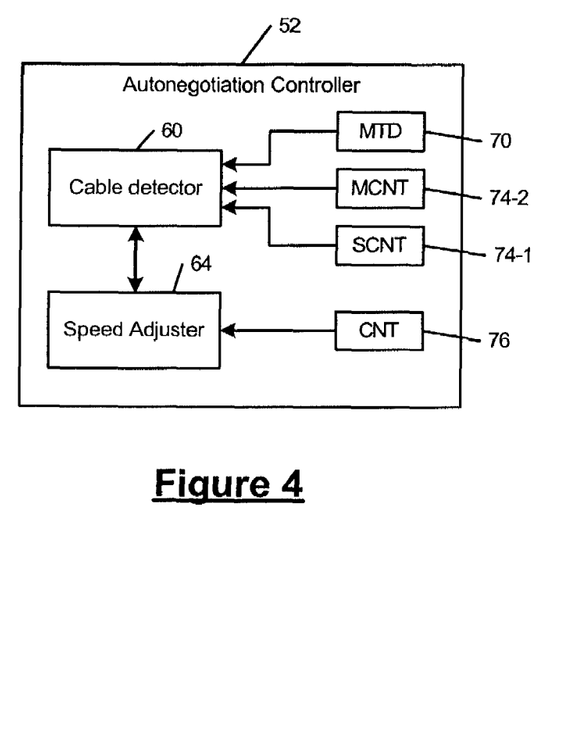
FIG. 4 illustrates the autonegotiation controller of FIG. 3 in further detail.

Referring now to FIG. 3, a physical layer 50 of a device includes an autonegotiation controller 52, a digital signal processor (DSP) 54 and other conventional physical layer circuits 58. The autonegotiation controller 52 includes a cable detector 60 and a speed adjuster 64. The cable detector 60 may include one or more timers 70 such as a maxwait timer done (MTD) and/or counters 74 such as slave counter SCNT 74-1 and/or master counter MCNT 74-2. The speed detector 64 includes a counter CNT 76.

The cable detector 60 determines the number of operable pairs of twisted pair wires provided by the cable 20. The speed adjuster 64 operates after the cable detector 60 determines the number of operable pairs of twisted pair wires. The speed adjuster 64 alters the autonegotiation speed advertisement of the devices when an insufficient number of twisted pair wires are available. The speed adjuster 64 will be described initially followed by the description of the cable detector 60.

Figure 5:
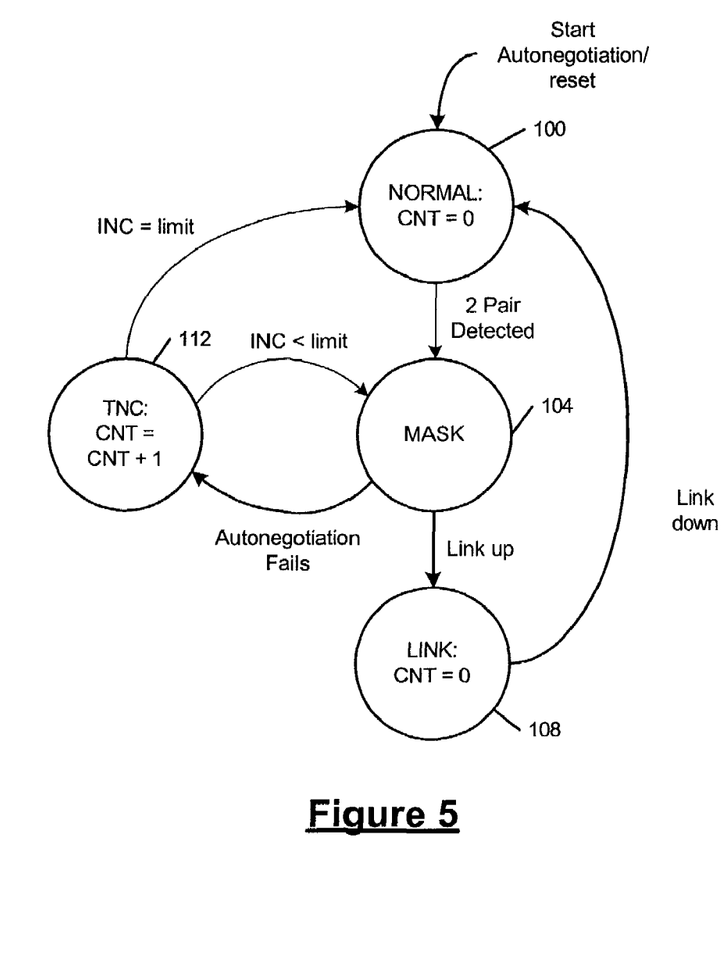
FIG. 5 is a state diagram for a speed adjuster according to the present invention.

Referring to FIG. 5, the state operation of the speed adjuster 64 of the autonegotiation controller 52 is shown. When reset or when autonegotiation is restarted, the speed adjuster 64 moves into the NORMAL state (state 100). In the NORMAL state 100, the autonegotiation controller 52 advertises all capabilities that the devices specify. In other words, the autonegotiation controller 52 functions conventionally.

When the cable detector 60 detects that the cable only has an insufficient number of operable twisted pair wires for the requested speed, the speed adjuster 64 transitions to the MASK state (state 104). In the MASK state 104, the autonegotiation controller 52 advertises all capabilities that the user enables except for the speed advertisement. In other words, the speed capabilities are masked. Otherwise, the autonegotiation controller 52 operates conventionally. Since the speed is not advertised if autonegotiation completes successfully, the devices will operate at lower speeds. In an exemplary embodiment, when gigabit speeds are requested and an insufficient number of operable twisted pair wires are available (e.g. less than four), operation continues in 10BASE-T and 100BASE-TX modes. Skilled artisans will appreciate that the present invention can be applied to different speeds and numbers of operable twisted pair wires.

When the devices operate at the lower speed, the link will come up and the autonegotiation controller 52 moves into a LINK state (state 108). If the link is lost (possibly due to unplugging of the cable), the autonegotiation controller 52 moves back into the NORMAL state 100.

One problem is a possible error condition that occurs when autonegotiation fails to complete in the MASK state 104. To solve this problem, a TNC state (state 112) increments the counter CNT 76 to count the number of times that autonegotiation fails to complete a link. If the counter CNT 76 exceeds a predetermined limit, the autonegotiation controller 52 returns to the NORMAL state 100. Otherwise the autonegotiation controller 52 returns to the MASK state 104. Note that the counter CNT 76 is reset to 0 whenever the autonegotiation controller 52 is in the NORMAL state 100 or the LINK state 108.

Figure 6:
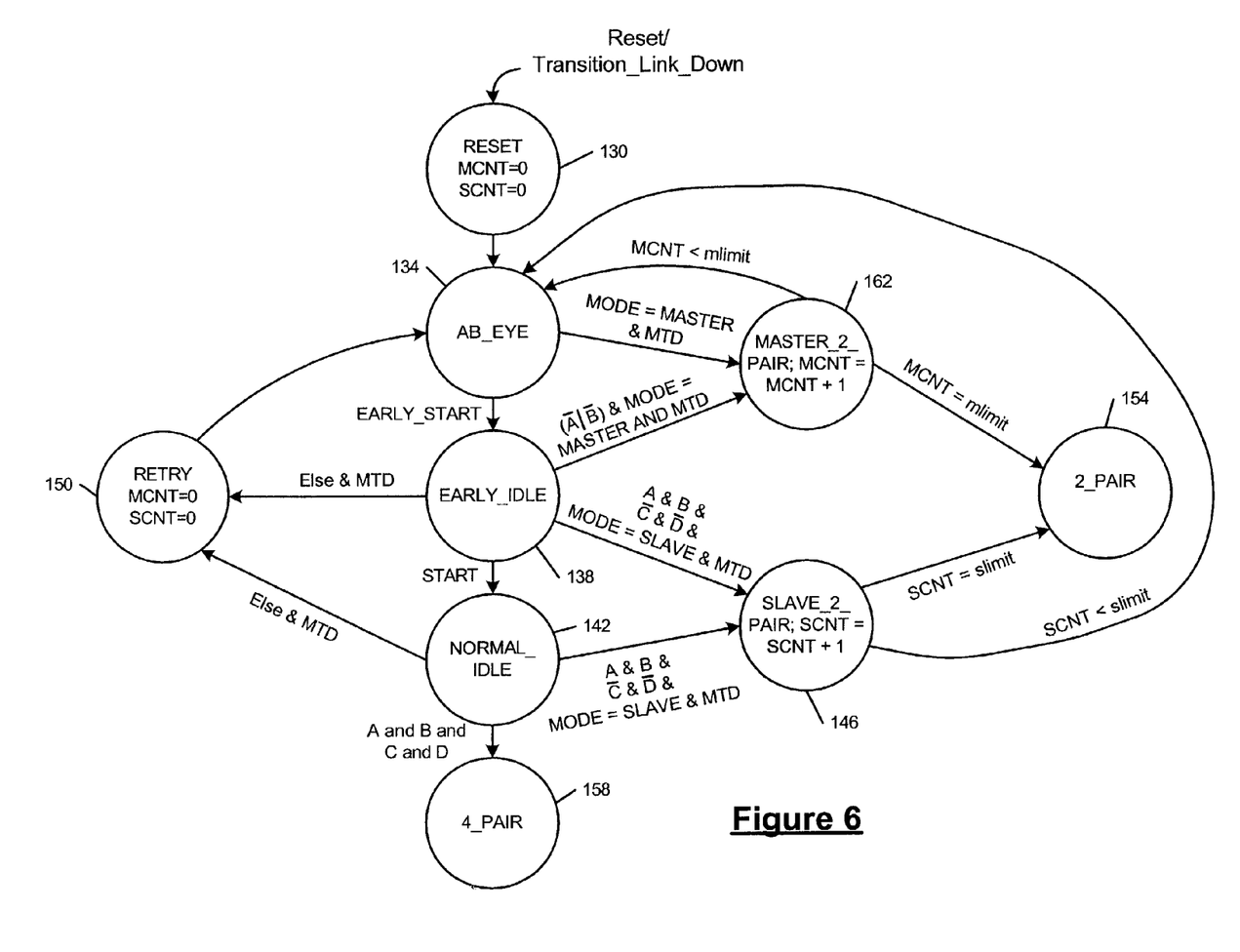
FIG. 6 is a state diagram for a cable detector according to the present invention.

Referring now to FIG. 6, a state diagram for the cable detector 60 of the autonegotiation controller 52 is shown. The cable detector 60 determines whether the cable includes two or four pairs of operable twisted pair wires. A maxwait timer done (MTD) signal is generated by the MTD timer 70. The MTD timer 70 sets the maximum time limit for the devices to establish a link. A MODE signal defines whether the device is a master M or a slave S. A, B, C, and D represent the four pairs of twisted pair wires. A and B are required for 10BASE-T and 100BASE-TX links. A, B, C, and D without a bar signifies that the designated pair was received correctly. A bar over A, B, C, and D signifies that the designated pair was received incorrectly. The twisted pair wires are referred to as A, B, C, and D rather than the pairs (1, 2) (3, 6), (4, 5), and (7, 8). In one configuration A=(1, 2) B=(3, 6), C=(4,5), and D=(7,8) and in the other configuration B=(1,2), A=(3,6), D=(4,5), C=(7,8). Using A, B, C, D allows a more simple description of the configurations.

An EARLY_START signal is generated by the DSP 54 when it has recovered the data reliably on either pairs A or B. During this time, the PCS (not shown) of the DSP 54 begins to examine the validity of the code on the received signal. A START signal is generated by the DSP 54 to indicate that the recovered signal is reliable. In other words, the PCS of the DSP 54 determines that the coding is correct. The signal TRANSITION_LINK_DOWN is generated when the link transitions from link up to link down. Once the link is down, the TRANSITION_LINK_DOWN signal is no longer generated.

The SCNT and MCNT counters 74 track the number of times that certain events occur. Upon reset or when the TRANSITION_LINK_DOWN is asserted, the cable detector 60 enters the RESET state (state 130). The SCNT and MCNT counters 74 are cleared. Then, the cable detector 60 transitions to the AB_EYE state (state 134). The operation of the autonegotiation controller 52 depends on whether the device is a master or a slave device.

In a first example, the pairs A and B are recovered correctly by the DSP 54 and the PCS of the DSP 54 determines that the coding is correct. The pairs C and D are either not recovered correctly or are recovered correctly but have incorrect coding. If the device is a slave device, the DSP 54 will always generate the EARLY_START signal because the master device will be the first device to transmit. The autonegotiation controller 52 moves into an EARLY_IDLE state (state 138). In this state, several things may happen. The DSP 54 can successfully recover data on the pairs A and B and the autonegotiation controller 52 will transition to a NORMAL_IDLE state (state 142) to check the received code further. The DSP 54 can successfully recover data on both pairs A and B with correct coding but cannot recover on the pairs C and D and the MTD timer 70 expires. In this case, the autonegotiation controller 52 moves into a SLAVE_2_PAIR state (state 146). In all other cases, when the MTD timer 70 times out, the autonegotiation controller 52 moves into a RETRY state (state 150).

If the autonegotiation controller 52 moves into the RETRY state 150, both MCNT and SCNT counters 74 are cleared and the autonegotiation controller 52 transitions to the AB_EYE state 134. The autonegotiation controller 52 detects a condition that prevents the receiver from locking when the received signal is not a signature of the two pair condition. Such conditions are normal because it sometimes takes the DSP 54 several attempts to link up. The clearing of the counters 74 reduces the possibility of false detection of the two pair condition.

If the autonegotiation controller 52 moves into the SLAVE_2_PAIR state 146, the SCNT counter 74 increments by 1. If SCNT counter 74 reaches a predetermined limit (slimit), the autonegotiation controller 52 transitions to a 2_PAIR state (state 154). Otherwise, the autonegotiation controller 52 transitions to the AB_EYE state 134. The limit value slimit is preferably greater than 1 to allow that the signature of the pairs A and B to be received multiple times before flagging the 2_PAIR state 154. In the 2_PAIR state 154, the autonegotiation controller 52 sets a flag signifying that a two pair condition was detected.

If the autonegotiation controller 52 is in the NORMAL_IDLE state 142, one of three possibilities can occur. If the coding on A, B, C and D is determined to be correct, then the autonegotiation controller 52 moves into a 4_PAIR state (state 158) and the device is run conventionally. If the pairs A and B have the correct coding but C and D do not have the correct coding and the MTD timer 70 expires, the autonegotiation controller 52 transitions to the SLAVE_2_PAIR state 146. If the MTD timer 70 expires and neither of the preceding conditions are met, the autonegotiation controller 52 moves into the RETRY state 150.

If the device is a master, the EARLY_START signal is not asserted if the cable includes only two pairs of twisted wire. This is because the slave device will never transmit to the master device because the slave device never recovers data on the pairs C and D (the pairs do not exist). The autonegotiation controller 52 moves into a MASTER_2_PAIR state (state 162) once the MTD timer 70 expires.

If the device is connected to four pairs of twisted pair wires, then the autonegotiation controller 52 will move through the EARLY_IDLE state 138, NORMAL_IDLE state 142, and the 4_PAIR state 158. Note that the autonegotiation controller 52 may also move into the RETRY state 150 if the DSP 54 does not successfully lock the first time, which sometimes occurs in normal operation.

If the autonegotiation controller 52 moves into the MASTER_2_PAIR state 162, the MCNT counter 74 increments by 1. If the MCNT counter 74 reaches a predetermined limit (mlimit), the autonegotiation controller 52 moves to the 2_PAIR state 154. Otherwise, the autonegotiation controller 52 transitions to the AB_EYE state. The limit value mlimit is preferably set to a number that is greater than 1 because it is possible that the slave device will not lock the first few times and will not transmit to the master. In a preferred embodiment, mlimit is set equal to 4 to minimize the chances of a false trigger.

It is possible that the DSP 54 will mistakenly lock onto the 0's on the pairs A and B and cause the EARLY_START signal to be asserted. In this case, the autonegotiation controller 52 goes to the EARLY_IDLE state 138. Since the coding on the pairs A and B is incorrect, autonegotiation controller 52 transitions to the MASTER_2_PAIR state 162 to detect the condition that the slave is not transmitting when the MTD timer 70 expires.

Skilled artisans will appreciate that the autonegotiation controller can be implemented as an application specific integrated circuit (ASIC), an analog circuit, a digital circuit, software executed by a processor and memory, or in any other suitable manner.

Thus it will be appreciated from the above that as a result of the present invention, a system and method for automatically controlling the transmission rate at which an Ethernet cable is operated is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting.

What is claimed is:

1. A physical layer of a first device that is connected to cable of an Ethernet network, comprising:
   a digital signal processor (DSP) coupled to said cable that receives and decodes first signals on said cable and that codes and transmits second signals on said cable; and
   an autonegotiation controller that communicates with said DSP and that includes a cable detector that determines a first number of pairs of twisted pair wires of said cable that are operable.

2. The physical layer of claim 1 wherein said cable includes at least one of two pairs of twisted pair wires and four pairs of twisted pair wires.

3. The physical layer of claim 1 wherein said autonegotiation controller includes a speed adjuster that masks an advertised speed of said first device when said cable detector determines that said first number is less than the number of twisted pair wires required to support a requested speed of said first device.

4. The physical layer of claim 3 wherein said requested speed is 1 Gigabit per second and said first number is two.

5. The physical layer of claim 3 wherein said speed adjuster does not mask said advertised speed of said first device when said first number is greater than or equal to the number of twisted pair wires that are required to support said requested speed.

6. The physical layer of claim 3 wherein said speed adjuster does not mask said advertised speed of said first device when said requested speed is less than 1 gigabit per second.

7. The physical layer of claim 3 wherein said speed adjuster increments a first counter when said cable detector determines that said first number is equal to two and autonegotiation fails.

8. The physical layer of claim 7 wherein said speed adjuster resets and sets said first counter equal to zero when said first counter is equal to a first limit.

9. The physical layer of claim 1 wherein a pair of twisted pair wires are inoperable if signals are not received on said pair.

10. The physical layer of claim 1 wherein a pair of twisted pair wires are inoperable if signals received by said pair cannot be decoded correctly by said DSP.

11. The physical layer of claim 1 wherein said cable detector includes a maxwait timer and has a first state.

12. The physical layer of claim 11 wherein said cable detector transitions from said first state to a second state when said DSP receives signals on at least one of a first pair and a second pair of twisted pair wires.

13. The physical layer of claim 12 wherein said cable detector transitions from said second state to a third state when said DSP receives and decodes signals on said first and second pairs of twisted pair wires.

14. The physical layer of claim 13 wherein said cable detector transitions from said second state to a fourth state when said DSP receives signals on at least one of said first and second pairs but not on a third pair and a fourth pair of twisted pair wires and said maxwait timer times out.

15. The physical layer of claim 14 wherein said cable detector transitions from said third state to said fourth state when said DSP receives and decodes signals on said first and second pairs but does not receive signals on said third and fourth pairs and said maxwait timer times out.

16. The physical layer of claim 15 wherein said cable detector includes a slave counter that is incremented each time said cable detector transitions to said fourth state.

17. The physical layer of claim 16 wherein said cable detector returns to said first state when said slave counter is less than slimit and said cable detector sets said first number equal to two when said slave counter equals slimit.

18. The physical layer of claim 17 wherein said cable detector transitions from said first state to a fifth state when said maxwait timer times out and said DSP fails to detect signals on said first pair and said second pair.

19. The physical layer of claim 18 wherein said cable detector includes a master counter that is incremented each time that said cable detector transitions to said fifth state.

20. The physical layer of claim 19 wherein said cable detector returns to said first state when said master counter is less than mlimit and said cable detector sets said first number equal to two when said master counter equals mlimit.

21. The physical layer of claim 20 wherein said cable detector sets said first number equal to four when said DSP receives and decodes signals on said first, second, third and fourth pairs.

22. The physical layer of claim 21 wherein said cable detector transitions from said second state to a sixth state when said maxwait timer times out, said DSP
   does not receive and decode signals on said first and second pairs of twisted pair wires, and said DSP does not receive signals on at least one of said first and second pairs but not said third and fourth pairs.

23. The physical layer of claim 22 wherein said cable detector transitions from said third state to a sixth state when said maxwait timer times out and said DSP does not receive and decode signals on said first, second, third and fourth pairs.

24. The physical layer of claim 23 further comprising a status indicator that notifies said first network device when said requested speed is being masked.

25. A physical layer of a first device that is connected to cable of an Ethernet network, comprising:
   cable including at least two pairs of twisted pair wires;
   a digital signal processor (DSP) coupled to said cable that receives and decodes first signals on said cable and that codes and transmits second signals on said cable; and
   an autonegotiation controller that communicates with said DSP and that includes a cable detector that determines a first number of pairs of twisted pair wires of said cable that are operable and a speed adjuster that masks an advertised speed of said first device when said cable detector determines that said first number is less than a number of twisted pair wires that are required to support a requested speed of said first device.

26. The physical layer of claim 25 wherein said speed adjuster does not mask said advertised speed of said first device when said first number is four.

27. The physical layer of claim 25 wherein said speed adjuster does not mask said advertised speed of said first device when said requested speed is less than 1 gigabit per second.

28. The physical layer of claim 25 wherein a pair of twisted pair wires are inoperable when at least one of signals are not received on said pair and signals received by said pair cannot be decoded correctly by said DSP.

29. The physical layer of claim 25 wherein said cable detector includes a maxwait timer.

30. The physical layer of claim 29 wherein said cable detector increments a slave counter when said maxwait timer times out and said DSP receives signals on first and second pairs of twisted pair wires but does not receive signals on third and fourth pairs of twisted pair wires.

31. The physical layer of claim 30 wherein said cable detector increments said slave counter when said maxwait timer times out and said DSP receives and decodes signals on said first and second pairs but does not receive signals on said third and fourth pairs of twisted pair wires.

32. The physical layer of claim 31 wherein said cable detector sets said first number equal to two when said slave counter is equal to slimit.

33. The physical layer of claim 32 further comprising a status indicator that notifies said first network device when said first speed is being masked.

34. A method for operating a physical layer of a first device that is connected to cable of an Ethernet network, comprising:
coupling a digital signal processor (DSP) to said cable;
receiving and decoding first signals on said cable;
coding and transmitting second signals on said cable;
communicating with said DSP using an autonegotiation controller; and
detecting a first number of pairs of twisted pair wires of said cable that are operable with a cable detector associated with said autonegotiation controller, wherein said autonegotiation controller includes said cable detector.

35. The method of claim 34 wherein said cable includes at least one of two pairs of twisted pair wires and four pairs of twisted pair wires.

36. The method of claim 35 further comprising determining that a pair of twisted pair wires are inoperable if signals received by said pair cannot be decoded correctly by said DSP.

37. The method of claim 34 further comprising masking an advertised speed of said first device using a speed adjuster when said cable detector determines that said first number is less than a number of twisted pair wires required to support a requested speed of said first device.

38. The method of claim 37 wherein said requested speed is 1 Gigabit per second and said first number is two.

39. The method of claim 37 wherein said speed adjuster does not mask said advertised speed of said first device when said first number is four.

40. The method of claim 37 wherein said speed adjuster does not mask said advertised speed of said first device when said requested speed is less than 1 gigabit per second.

41. The method of claim 37 further comprising incrementing a first counter using said speed adjuster when said cable detector determines that said first number is equal to two and autonegotiation fails.

42. The method of claim 41 further comprising setting said first counter equal to zero using said speed adjuster when said first counter is equal to a first limit.

43. The method of claim 34 further comprising determining that a pair of twisted pair wires are inoperable if signals are not received on said pair.

44. The method of claim 34 wherein said cable detector includes a maxwait timer and has a first state.

45. The method of claim 44 further comprising transitioning from said first state to a second state of said cable detector when said DSP receives signals on at least one of a first pair and a second pair of twisted pair wires.

46. The method of claim 45 further comprising transitioning from said second state to a third state of said cable detector when said DSP receives and decodes signals on said first and second pairs of twisted pair wires.

47. The method of claim 46 further comprising transitioning from said second state to a fourth state of said cable detector when said DSP receives signals on at least one of said first and second pairs but not on a third pair and a fourth pair of twisted pair wires and said maxwait timer times out.

48. The method of claim 47 further comprising transitioning from said third state to said fourth state when said DSP receives and decodes signals on said first and second pairs but does not receive signals on said third and fourth pairs and said maxwait timer times out.

49. The method of claim 48 wherein said cable detector includes a slave counter and further comprising incrementing said slave counter each time that said cable detector transitions to said fourth state.

50. The method of claim 49 further comprising:
returning to said first state when said slave counter is less than slimit; and
setting said first number equal to two when said slave counter equals slimit.

51. The method of claim 50 further comprising transitioning from said first state to a fifth state of said cable detector when said maxwait timer times out and said DSP fails to detect signals on said first pair and said second pair.

52. The method of claim 51 wherein said cable detector includes a master counter that is incremented each time that said cable detector transitions to said fifth state.

53. The method of claim 52 further comprising:
returning to said first state when said master counter is less than mlimit; and
setting said first number equal to two when said master counter equals mlimit.

54. The method of claim 53 wherein said cable detector sets said first number equal to four when said DSP receives and decodes signals on said first, second, third and fourth pairs.

55. The method of claim 54 further comprising transitioning from said second state to a sixth state of said cable detector when said maxwait timer times out and said DSP does not receive and decode signals on said first and second pairs of twisted pair wires.

56. The method of claim 55 further comprising transitioning from said third state to a sixth state of said cable detector when said maxwait timer times out and said DSP does not receive and decode signals on said first, second, third and fourth pairs.

57. The method of claim 56 further comprising generating a status indicator that notifies said first network device when said requested speed is being masked.

58. A physical layer of a first device that is connected to cable of an Ethernet network, comprising:
signal processing means coupled to said cable for receiving and decoding first signals on said cable and for coding and transmitting second signals on said cable; and
autonegotiation means for communicating with said signal processing means and including cable detector means for determining a first number of pairs of twisted pair wires of said cable that are operable.

59. The physical layer of claim 58 wherein said cable includes at least one of two pairs of twisted pair wires and four pairs of twisted pair wires.

60. The physical layer of claim 58 wherein said autonegotiation means includes speed adjustment means for masking an advertised speed of at least one of said first and second devices when said cable detector means determines that said first number is less than the number of twisted pair wires required for a requested speed of said first device.

61. The physical layer of claim 60 wherein said requested speed is 1 Gigabit per second and said first number is two.

62. The physical layer of claim 60 wherein said speed adjustment means does not mask said advertised speed of said first device when said first number is four.

63. The physical layer of claim 60 wherein said speed adjustment means does not mask said advertised speed of said first device when said requested speed is less than said first speed.

64. The physical layer of claim 60 wherein said speed adjuster increments a first counter when said cable detector means determines that said first number is equal to two and autonegotiation fails.

65. The physical layer of claim 64 wherein said speed adjustment means resets and sets said first counter equal to zero when said first counter is equal to a first limit.

66. The physical layer of claim 58 wherein a pair of twisted pair wires are inoperable if signals are not received on said pair.

67. The physical layer of claim 58 wherein a pair of twisted pair wires are inoperable if signals received by said pair cannot be decoded correctly by said signal processing means.

68. The physical layer of claim 58 wherein said cable detector means includes a maxwait timer and has a first state.

69. The physical layer of claim 68 wherein said cable detector means transitions from said first state to a second state when said signal processing means receives signals on at least one of a first pair and a second pair of twisted pair wires.

70. The physical layer of claim 69 wherein said cable detector means transitions from said second state to a third state when said signal processing means receives and decodes signals on said first and second pairs of twisted pair wires.

71. The physical layer of claim 70 wherein said cable detector means transitions from said second state to a fourth state when said signal processing means receives signals on at least one of said first and second pairs but not on a third pair and a fourth pair of twisted pair wires and said maxwait timer times out.

72. The physical layer of claim 71 wherein said cable detector means transitions from said third state to said fourth state when said signal processing means receives and decodes signals on said first and second pairs but does not receive signals on said third and fourth pairs and said maxwait timer times out.

73. The physical layer of claim 72 wherein said cable detector means includes a slave counter that is incremented each time said cable detector means transitions to said fourth state.

74. The physical layer of claim 73 wherein said cable detector means returns to said first state when said slave counter is less than slimit and said cable detector means sets said first number equal to two when said slave counter equals slimit.

75. The physical layer of claim 74 wherein said cable detector means transitions from said first state to a fifth state when said maxwait timer times out and said signal processing means fails to detect signals on said first pair and said second pair.

76. The physical layer of claim 75 wherein said cable detector means includes a master counter that is incremented each time that said cable detector means transitions to said fifth state.

77. The physical layer of claim 76 wherein said cable detector means returns to said first state when said master counter is less than mlimit and said cable detector means sets said first number equal to two when said master counter equals mlimit.

78. The physical layer of claim 77 wherein said cable detector means sets said first number equal to four when said signal processing means receives and decodes signals on said first, second, third and fourth pairs.

79. The physical layer of claim 78 wherein said cable detector means transitions from said second state to a sixth state when said maxwait timer times out and said signal processing means does not receive and decode signals on said first and second pairs of twisted pair wires.

80. The physical layer of claim 79 wherein said cable detector means transitions from said third state to a sixth state when said maxwait timer times out and said signal processing means does not receive and decode signals on said first, second, third and fourth pairs.

81. The physical layer of claim 80 further comprising status indicating means for notifying said first network device when said first speed is being masked.

82. An Ethernet network, comprising:
a first network device with a first physical layer including a first digital signal processor (DSP) coupled to cable that receives and decodes first signals on said cable and that codes and transmits second signals on said cable, and a first autonegotiation controller that communicates with said first DSP and that includes a first cable detector that determines a first number of pairs of twisted pair wires of said cable that are operable; and
a second network device with a second physical layer including a second DSP coupled to said cable that receives and decodes said second signals on said cable and that codes and transmits said first signals on said cable.

83. The Ethernet network of claim 82 wherein said second network device includes a second autonegotiation controller that communicates with said second DSP and that includes a second cable detector that determines a first number of pairs of twisted pair wires of said cable that are operable.

84. The Ethernet network of claim 83 wherein a pair of twisted pair wires are inoperable if signals are not received on said pair.

85. The Ethernet network of claim 83 wherein a pair of twisted pair wires are inoperable if signals received by said pair cannot be decoded correctly by said first DSP.

86. The Ethernet network of claim 82 wherein said cable includes at least one of two pairs of twisted pair wires and four pairs of twisted pair wires.

87. The Ethernet network of claim 82 wherein said first autonegotiation controller includes a first speed adjuster that masks an advertised speed of said first device when said first cable detector determines that said first number is equal to two and when a first speed is requested by said first device.

88. The Ethernet network of claim 87 wherein said first speed is 1 Gigabit per second.

89. The Ethernet network of claim 87 wherein said first speed adjuster does not mask said advertised speed of said first device when said first number is four.

90. The Ethernet network of claim 87 wherein said first speed adjuster does not mask said advertised speed of said first device when said requested speed is less than said first speed.

91. The Ethernet network of claim 87 wherein said first speed adjuster increments a first counter when said first cable detector determines that said first number is equal to two and autonegotiation fails.

92. The Ethernet network of claim 91 wherein said first speed adjuster resets and sets said first counter equal to zero when said first counter is equal to a first limit.

93. The Ethernet network of claim 83 wherein said first cable detector includes a maxwait timer and has a first state.

94. The Ethernet network of claim 93 wherein said first cable detector transitions from said first state to a second state when said first DSP receives signals on at least one of a first pair and a second pair of twisted pair wires.

95. The Ethernet network of claim 94 wherein said first cable detector transitions from said second state to a third state when said first DSP receives and decodes signals on said first and second pairs of twisted pair wires.

96. The Ethernet network of claim 95 wherein said first cable detector transitions from said second state to a fourth state when said first DSP receives signals on at least one of said first and second pairs but not on a third pair and a fourth pair of twisted pair wires and said maxwait timer times out.

97. The Ethernet network of claim 96 wherein said first cable detector transitions from said third state to said fourth state when said first DSP receives and decodes signals on said first and second pairs but does not receive signals on said third and fourth pairs and said maxwait timer times out.

98. The Ethernet network of claim 97 wherein said first cable detector includes a slave counter that is incremented each time said first cable detector transitions to said fourth state.

99. The Ethernet network of claim 98 wherein said first cable detector returns to said first state when said slave counter is less than slimit and said first cable detector sets said first number equal to two when said slave counter equals slimit.

100. The Ethernet network of claim 99 wherein said first cable detector transitions from said first state to a fifth state when said maxwait timer times out and said first DSP fails to detect signals on said first pair and said second pair.

101. The Ethernet network of claim 100 wherein said first cable detector includes a master counter that is incremented each time that said first cable detector transitions to said fifth state.

102. The Ethernet network of claim 101 wherein said first cable detector returns to said first state when said master counter is less than mlimit and said cable detector sets said first number equal to two when said master counter equals mlimit.

103. The Ethernet network of claim 102 wherein said first cable detector sets said first number equal to four when said first DSP receives and decodes signals on said first, second, third and fourth pairs.

104. The Ethernet network of claim 103 wherein said first cable detector transitions from said second state to a sixth state when said maxwait timer times out and said first DSP does not receive and decode signals on said first and second pairs of twisted pair wires.

105. The Ethernet network of claim 104 wherein said first cable detector transitions from said third state to a sixth state when said maxwait timer times out and said first DSP does not receive and decode signals on said first, second, third and fourth pairs.

106. The Ethernet network of claim 105 further comprising a status indicator that notifies said first network device when said first speed is being masked.

107. A network device that is connected to cable of an Ethernet network, comprising:
a physical layer including:
a digital signal processor (DSP) coupled to said cable that receives and decodes first signals on said cable and that codes and transmits second signals to said second device on said cable; and
an autonegotiation controller that communicates with said DSP and that includes a cable detector that determines a first number of pairs of twisted pair wires of said cable that are operable.

108. The network device of claim 107 wherein said first signals are transmitted by a second network device.

109. The network device of claim 107 wherein said cable includes at least one of two pairs of twisted pair wires and four pairs of twisted pair wires.

110. The network device of claim 109 wherein a pair of twisted pair wires are inoperable if signals are not received on said pair.

111. The network device of claim 109 wherein a pair of twisted pair wires are inoperable if signals received by said pair cannot be decoded correctly by said DSP.

112. The network device of claim 107 wherein said autonegotiation controller includes a speed adjuster that masks an advertised speed of said first network device when said cable detector determines that said first number is equal to two and that a first speed is requested by said first network device.

113. The network device of claim 112 wherein said first speed is 1 Gigabit per second.

114. The network device of claim 112 wherein said speed adjuster does not mask said advertised speed of said first network device when said first number is four.

115. The network device of claim 112 wherein said speed adjuster does not mask said advertised speed of said first network device when said requested speeds are less than said first speed.

116. The network device of claim 112 wherein said speed adjuster increments a first counter when said cable detector determines that said first number is equal to two and autonegotiation fails.

117. The network device of claim 116 wherein said speed adjuster resets and sets said first counter equal to zero when said first counter is equal to a first limit.

118. The network device of claim 117 wherein said cable detector includes a maxwait timer and has a first state.

119. The network device of claim 118 wherein said cable detector transitions from said first state to a second state when said DSP receives signals on at least one of a first pair and a second pair of twisted pair wires.

120. The network device of claim 119 wherein said cable detector transitions from said second state to a third state when said DSP receives and decodes signals on said first and second pairs of twisted pair wires.

121. The network device of claim 120 wherein said cable detector transitions from said second state to a fourth state when said DSP receives signals on at least one of said first and second pairs but not on a third pair and a fourth pair of twisted pair wires and said maxwait timer times out.

122. The network device of claim 121 wherein said cable detector transitions from said third state to said fourth state when said DSP receives and decodes signals on said first and second pairs but does not receive signals on said third and fourth pairs and said maxwait timer times out.

123. The network device of claim 122 wherein said cable detector includes a slave counter that is incremented each time said cable detector transitions to said fourth state.

124. The network device of claim 123 wherein said cable detector returns to said first state when said slave counter is less than slimit and said cable detector sets said first number equal to two when said slave counter equals slimit.

125. The network device of claim 124 wherein said cable detector transitions from said first state to a fifth state when said maxwait timer times out and said DSP fails to detect signals on said first pair and said second pair.

126. The network device of claim 125 wherein said cable detector includes a master counter that is incremented each time that said cable detector transitions to said fifth state.

127. The network device of claim 126 wherein said cable detector returns to said first state when said master counter is less than mlimit and said cable detector sets said first number equal to two when said master counter equals mlimit.

128. The network device of claim 127 wherein said cable detector sets said first number equal to four when said DSP receives and decodes signals on said first, second, third and fourth pairs.

129. The network device of claim 128 wherein said cable detector transitions from said second state to a sixth state when said maxwait timer times out and said DSP does not receive and decode signals on said first and second pairs of twisted pair wires.

130. The network device of claim 129 wherein said cable detector transitions from said third state to a sixth state when said maxwait timer times out and said DSP does not receive and decode signals on said first, second, third and fourth pairs.

131. The network device of claim 130 further comprising a status indicator that notifies said first network device when said first speed is being masked.

132. A method for operating a physical layer of a first device that is connected to cable of an Ethernet network, comprising:
- coupling said cable to a digital signal processor (DSP);
- receiving and decoding first signals on said cable using said DSP;
- coding and transmitting second signals on said cable using said DSP;
- determining a first number of pairs of twisted pair wires of said cable that are operable using a cable detector; and
- masking an advertised speed of said first device using an autonegotiation controller when said first number is less than a number of twisted pair wires that are required to support a requested speed of said first device wherein said autonegotiation controller includes said cable detector.

133. The method of claim 132 wherein said advertised speed of said first device is not masked when said first number is four.

134. The method of claim 132 wherein said advertised speed of said first device is not masked when said requested speed is less than 1 gigabit per second.

135. The method of claim 132 further comprising determining that a pair of twisted pair wires are inoperable when at least one of signals are not received on said pair and signals received by said pair cannot be decoded correctly by said DSP.

136. The method of claim 132 further comprising starting a maxwait timer.

137. The method of claim 136 further comprising incrementing a slave counter when said maxwait timer times out and said DSP receives signals on first and second pairs of twisted pair wires but does not receive signals on third and fourth pairs of twisted pair wires.

138. The method of claim 137 further comprising incrementing said slave counter when said maxwait timer times out and said DSP receives and decodes signals on said first and second pairs but does not receive signals on said third and fourth pairs of twisted pair wires.

139. The method of claim 138 further comprising setting said first number equal to two when said slave counter is equal to slimit.

140. The method of claim 139 further comprising generating a status signal that notifies said first network device when said first speed is being masked.

141. A software method for operating a physical layer of a first device that is connected to cable of an Ethernet network, comprising:
- coupling said cable to a digital signal processor (DSP);
- receiving and decoding first signals on said cable using said DSP;
- coding and transmitting second signals on said cable using said DSP;
- determining a first number of pairs of twisted pair wires of said cable that are operable using a cable detector; and
- masking an advertised speed of said first device using an autonegotiation controller when said first number is less than a number of twisted pair wires that are required to support a requested speed of said first device, wherein said autonegotiation controller includes said cable detector.

142. The software method of claim 141 wherein said advertised speed of said first device is not masked when said first number is four.

143. The software method of claim 141 wherein said advertised speed of said first device is not masked when said requested speed is less than 1 gigabit per second.

144. The software method of claim 141 further comprising determining that a pair of twisted pair wires are inoperable when at least one of signals are not received on said pair and signals received by said pair cannot be decoded correctly by said DSP.

145. The software method of claim 141 further comprising starting a maxwait timer.

146. The software method of claim 145 further comprising incrementing a slave counter when said maxwait timer times out and said DSP receives signals on first and second pairs of twisted pair wires but does not receive signals on third and fourth pairs of twisted pair wires.

147. The software method of claim 146 further comprising incrementing said slave counter when said maxwait timer times out and said DSP receives and decodes signals on said first and second pairs but does not receive signals on said third and fourth pairs of twisted pair wires.

148. The software method of claim 147 further comprising setting said first number equal to two when said slave counter is equal to slimit.

149. The software method of claim 147 further comprising generating a status signal that notifies said first network device when said first speed is being masked.

150. A physical layer of a first device that is connected to cable of an Ethernet network, comprising:
- signal processing means coupled to said cable for receiving and decoding first signals on said cable and for coding and transmitting second signals on said cable; and
- autonegotiation control means for communicating with said signal processing means and including cable detection means for determining a first number of pairs of twisted pair wires of said cable that are operable and speed adjusting means for masking an advertised speed of said first device when said cable detection means determines that said first number is less than a number of twisted pair wires that are required to support a requested speed of said first device.

151. The physical layer of claim 150 wherein said speed adjusting means does not mask said advertised speed of said first device when said first number is four.

152. The physical layer of claim 150 wherein said speed adjusting means does not mask said advertised speed of said first device when said requested speed is less than 1 gigabit per second.

153. The physical layer of claim 150 wherein a pair of twisted pair wires are inoperable when at least one of signals are not received on said pair and signals received by said pair cannot be decoded correctly by said signal processing means.

154. The physical layer of claim 150 wherein said cable detection means includes a maxwait timer.

155. The physical layer of claim 154 wherein said cable detection means increments a slave counter when said maxwait timer times out and said signal processing means receives signals on first and second pairs of twisted pair wires but does not receive signals on third and fourth pairs of twisted pair wires.

156. The physical layer of claim 155 wherein said cable detection means increments said slave counter when said maxwait timer times out and said signal processing means receives and decodes signals on said first and second pairs but does not receive signals on said third and fourth pairs of twisted pair wires.

157. The physical layer of claim 156 wherein said cable detection means sets said first number equal to two when said slave counter is equal to slimit.

158. The physical layer of claim 157 further comprising status indicating means for notifying said first network device when said first speed is being masked.

* * * * *